United States Patent
Lin

(10) Patent No.: US 11,095,466 B2
(45) Date of Patent: Aug. 17, 2021

(54) PACKET TRANSMISSION CONTROL METHOD AND PACKET TRANSMISSION CIRCUIT

(71) Applicant: Realtek Semiconductor Corporation, Hsinchu (TW)

(72) Inventor: Chung-Chang Lin, Zhubei (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 16/704,051

(22) Filed: Dec. 5, 2019

(65) Prior Publication Data
US 2020/0344080 A1 Oct. 29, 2020

(30) Foreign Application Priority Data
Apr. 25, 2019 (TW) ................. 108114567

(51) Int. Cl.
*H04L 12/12* (2006.01)
*H04L 12/24* (2006.01)

(52) U.S. Cl.
CPC .............. *H04L 12/12* (2013.01); *H04L 41/12* (2013.01)

(58) Field of Classification Search
CPC ...................... H04L 12/12; H04L 12/10; H04L 2012/40273; H04L 67/12; H04L 2012/40215; H04L 12/40045; H04L 12/2801; H04L 12/40; H04L 41/12; H04L 67/1097; H04L 67/125
USPC .......................................... 375/130; 370/338
See application file for complete search history.

(56) References Cited

U.S. PATENT DOCUMENTS

| 2005/0025084 | A1 | 2/2005 | Heuts et al. | |
| 2011/0239024 | A1* | 9/2011 | Hsieh | G06F 1/3203 713/323 |
| 2019/0191376 | A1* | 6/2019 | Kim | H04W 52/0229 |

FOREIGN PATENT DOCUMENTS

CN 108539743 A 9/2018

OTHER PUBLICATIONS

China Patent Office, the office action of the corresponding Chinese application No. 201910367451.1 dated May 14, 2021.

* cited by examiner

*Primary Examiner* — David C Payne
*Assistant Examiner* — Sarah Hassan
(74) *Attorney, Agent, or Firm* — Locke Lord LLP; Tim Tingkang Xia, Esq.

(57) ABSTRACT

A packet transmission control method used in a packet transmission circuit is provided that includes the steps outlined below. A packet receiving circuit, processing circuits and a packet sending circuit of the packet transmission circuit are kept in a non-operation status. The packet receiving circuit is woken up to the operation status to receive the packet stream and is restored to the non-operation status. The processing circuits are woken up to an operation status respectively according to an operation order thereof to receive, transmit and process the packet stream within a respective process time period and are restored to the non-operation status after the packet stream is processed. The packet sending circuit is woken up to the operation status to transmit the packet stream processed by the processing circuits to an external device and is restored to the non-operation status after the packet stream is transmitted.

10 Claims, 4 Drawing Sheets

PACKET TRANSMISSION CONTROL METHOD AND PACKET TRANSMISSION CIRCUIT

RELATED APPLICATIONS

This application claims priority to Taiwan Application Serial Number 108114567, filed Apr. 25, 2019, which is herein incorporated by reference.

BACKGROUND

Field of Invention

The present invention relates to a packet transmission technology. More particularly, the present invention relates to a packet transmission control method and a packet transmission circuit.

Description of Related Art

The packet transmission interface control integrated circuit, either equipped with wireless or wired network connection ability, has power saving mechanism that turns off power or turns off clock according to the operation mode of the integrated circuit in order to save the power when it is not in operation. When the integrated circuit does not need to receive or transmit packets, most of the unused circuits are turned off to enter the power-saving mode. Only the circuit such as the packet detection circuit is required to be turned on.

Under the power-saving mode, the packet detection circuit turns on the receiving circuit when the packets are detected. However, since the packets are processed layer by layer from a front-end high frequency circuit or an analog circuit to a control layer circuit in the integrated circuit, the operation times to process the packets of the circuit layers are not the same and the operation times to process the packets of the internal functional modules of each of the circuit layers are not the same either. During operation, the circuit layers and the functional modules may be in an idle status in which no packet is required to be processed. For example, when a previous circuit layer has not finished processing the packets or when the packets are transmitted to a next circuit layer, an unnecessary power dissipation of the current circuit layer is generated. When the packets are required to be transmitted, though the uncertainty of when to start the transmission process is lower, the packets are still processed layer by layer from a control layer circuit in the integrated circuit to a front-end high frequency circuit or an analog circuit. The operation times to process the packets of the circuit layers are not the same and the operation times to process the packets of the internal functional modules of each of the circuit layers are not the same either. An unnecessary power dissipation of the current circuit layer is still generated.

Accordingly, what is needed is a packet transmission control method and a packet transmission circuit to address the issues mentioned above.

SUMMARY

An aspect of the present invention is to provide a packet transmission control method used in a packet transmission circuit that includes the steps outlined below. A packet receiving circuit, a plurality of processing circuits and a packet sending circuit of the packet sending circuit are kept in a non-operation status. The packet receiving circuit is determined to be required to receive a packet stream to wake up the packet receiving circuit to the operation status to receive the packet stream and the packet receiving circuit is further restored to the non-operation status after the packet stream is received. The processing circuits are woken up to an operation status within a required operation time respectively according to an operation order thereof to receive and transmit the packet stream from the packet receiving circuit and process the packet stream within a respective process time period and the processing circuits are restored to the non-operation status after the packet stream is processed. The packet sending circuit is woken up to the operation status to transmit the packet stream processed by the processing circuits to an external device and the packet sending circuit is restored to the non-operation status after the packet stream is transmitted.

Another aspect of the present invention is to provide a packet transmission circuit that includes a packet receiving circuit, a plurality of processing circuits and a packet sending circuit. The packet receiving circuit is configured to be in a non-operation status, configured to be woken up to an operation status to receive a packet stream when the packet receiving circuit is determined to be required to receive the packet stream and configured to be restored to the non-operation status after the packet stream is received. The processing circuits are configure to be in the non-operation status, configured to be woken up to the operation status within a required operation time respectively according to an operation order thereof to receive and transmit the packet stream from the packet receiving circuit, configure to process the packet stream within a respective process time period and configure to be restored to the non-operation status after the packet stream is processed. The packet sending circuit is configured to be in the non-operation status, configured to be woken up to the operation status to transmit the packet stream processed by the processing circuits to an external device and configured to be restored to the non-operation status after the packet stream is transmitted.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
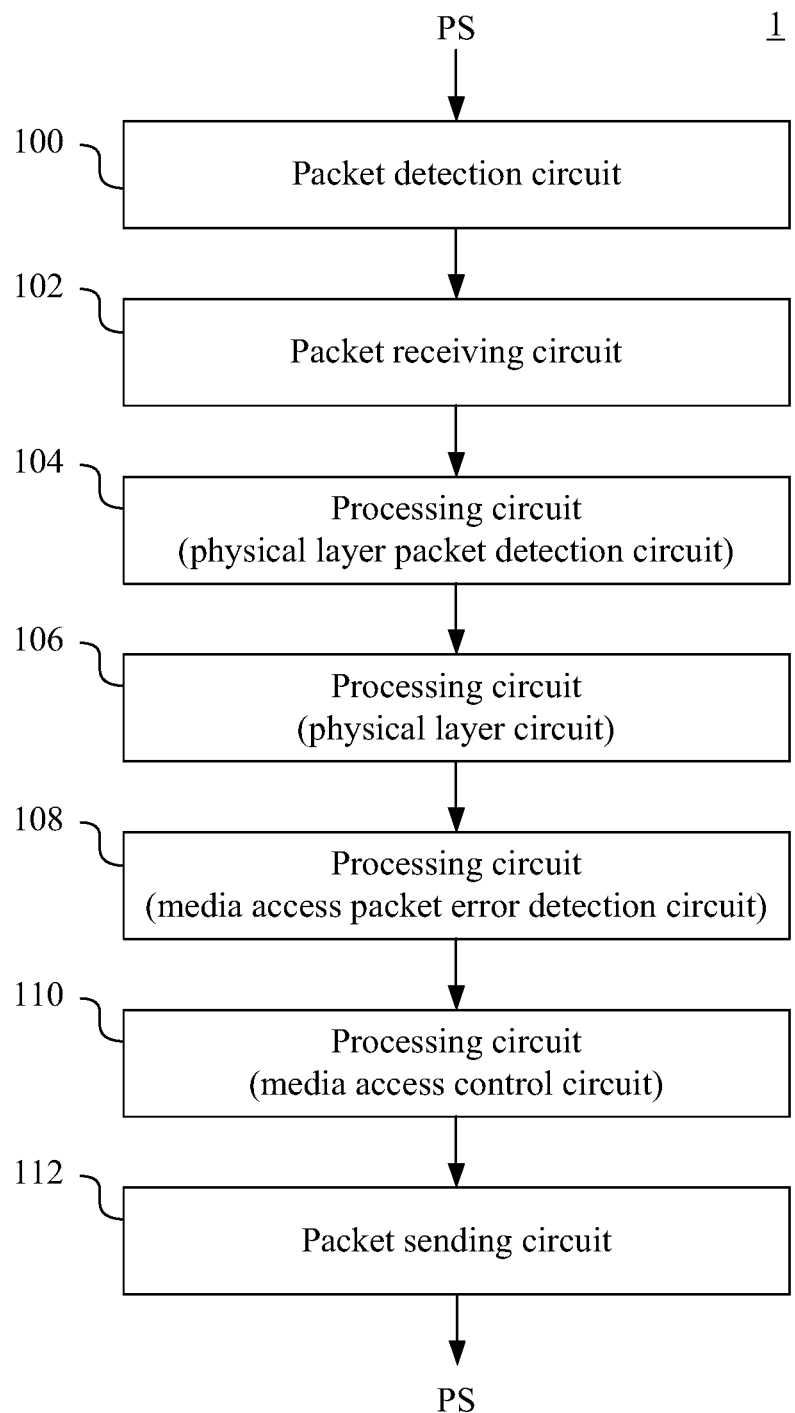
FIG. 1 is a block diagram of a packet transmission circuit in an embodiment of the present invention.
Figure 2:
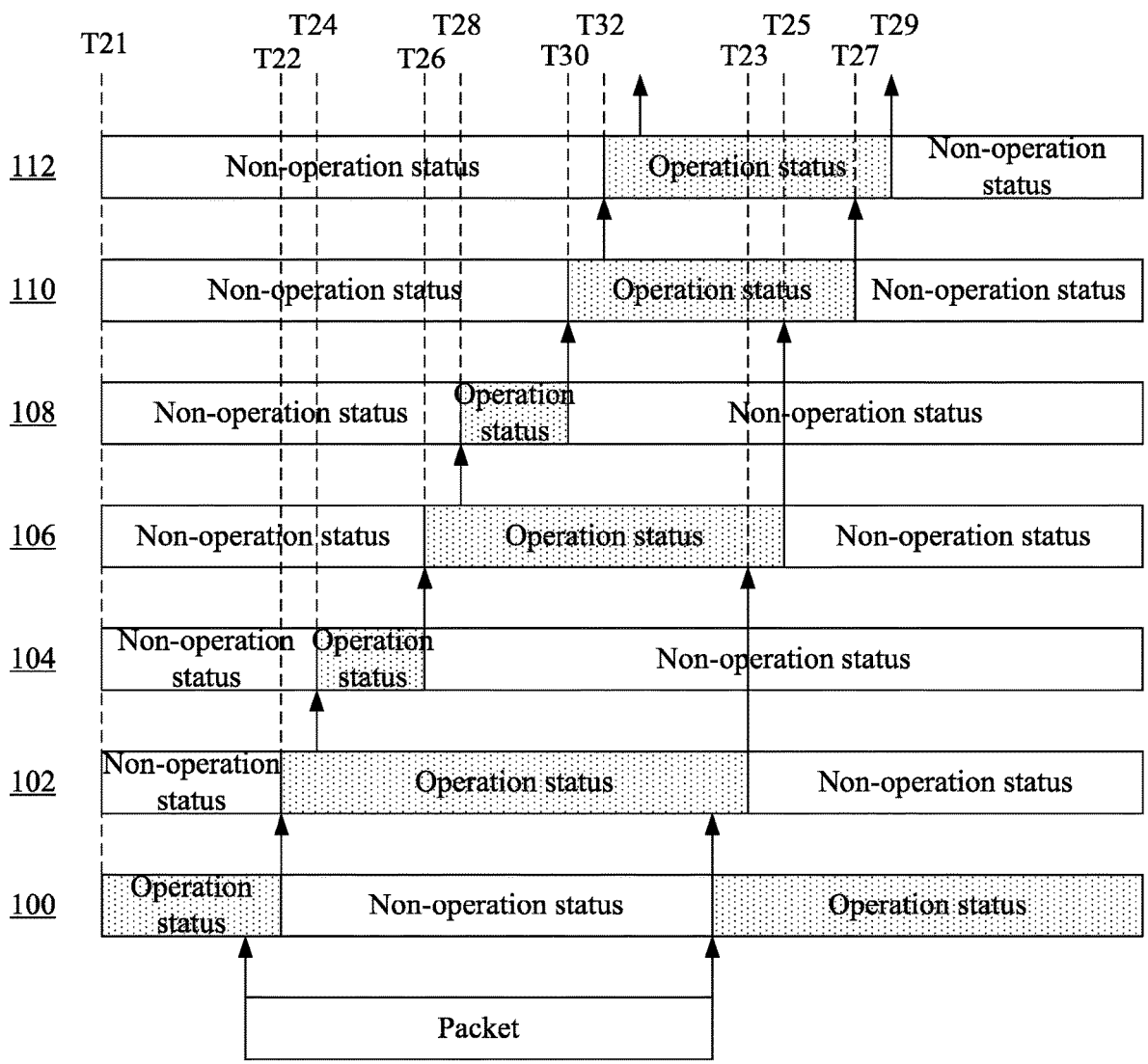
FIG. 2 is a timing diagram of the operation of each of the circuits included in the packet transmission circuit in an embodiment of the present invention.

Reference is made to FIG. 1 and FIG. 2 at the same time. FIG. 1 is a block diagram of a packet transmission circuit 1 in an embodiment of the present invention. FIG. 2 is a timing diagram of the operation of each of the circuits included in the packet transmission circuit 1 in an embodiment of the present invention.

The packet transmission circuit 1 includes a packet detection circuit 100, a packet receiving circuit 102, a plurality of processing circuits 104, 106, 108 and 110 and a packet sending circuit 112. In the present embodiment, the packet transmission circuit 1 is a receiving terminal (RX) of a network apparatus.

The packet detection circuit 100 may include a part of a front-end circuit. When the packet transmission circuit 1 is disposed in a wireless network apparatus, the front-end circuit can be a radio frequency (RF) circuit. When the packet transmission circuit 1 is disposed in a wired network apparatus, the front-end circuit can be an Ethernet circuit.

In the present embodiment, since the packet transmission circuit 1 is the receiving terminal of the network apparatus, the packet transmission circuit 1 is not able to predict when a packet stream is received. As a result, the packet detection circuit 100 is kept in an operation status before a packet is detected to keep performing detection. As illustrated in FIG. 2, the packet detection circuit 100 is kept in the operation status from the time spot T21 and before the packet is detected.

When the packet detection circuit 100 detects the packet stream PS, the packet receiving circuit 102 is woken up to receive the packets in the packet stream PS.

The processing circuits 104, 106, 108 and 110 include such as, but not limited to a physical layer circuit and a media access control (MAC) circuit. In the present embodiment, the processing circuit 104 is a physical layer packet detection circuit, the processing circuit 106 is the physical layer circuit, the processing circuit 108 is a media access packet error detection circuit, and the processing circuit 110 is the media access control circuit.

The processing circuits 104, 106, 108 and 110 are configured to be in a non-operation status, configured to be woken up to the operation status within a required operation time respectively according to an operation order thereof to perform packet detection and error detection on the packet stream PS, receive the packet stream PS, process the packet stream PS and transmit the packet stream PS. After finishing operation, the processing circuits 104, 106, 108 and 110 are restored to the non-operation status.

In an embodiment, when the packet detection circuit 100 detects the packet, the packet detection circuit 100 wakes up the packet receiving circuit 102, which is the front-end circuit, to receive the packet stream PS. Further, the packet receiving circuit 102 wakes up the processing circuit 104, which is the physical layer packet detection circuit, and transmits the packets to the processing circuit 104. The processing circuit 104 detects the packet and determines whether the packet is received. If the packet is not required to be received, the packet is discarded and the related circuit is restored to the non-operation status. If the packet is required to be received, the processing circuit 104 wakes up the processing circuit 106, which is the physical layer circuit, and transmits the packet to the processing circuit 106. The processing circuit 106 further processes the packet, wakes up the processing circuit 108, which is the media access packet error detection circuit, and transmits the packet to the processing circuit 108.

The processing circuit 108 detects the packet and determines whether the packet is received. If the packet is not required to be received, the packet is discarded and the related circuit is restored to the non-operation status. If the packet is required to be received, the processing circuit 108 wakes up the processing circuit 110, which is the media access control circuit, and transmits the packet to the processing circuit 110. The processing circuit 110 processes the packet, wakes up the packet sending circuit 112 and transmits the packet to the packet sending circuit 112. The procedure described above is to process the packet layer by layer until the packet is finished being processed. Each of the layers is woken up only when these layers are required to be in operation and is restored to the non-operation status after the operation.

The operation timing of each of the circuit layers is described in detail in accompany with the timings illustrated in FIG. 2.

As illustrated in FIG. 2, the packet receiving circuit 102 is in the non-operation status at the time spot T21. At the time spot T22, the packet receiving circuit 102 is woken up to receive the packet stream PS and processes the packet stream PS during the process time period from the time spot T22 to the time spot T23. Further, the packet receiving circuit 102 finishes processing the packet stream PS at the time spot T23 and is restored to the non-operation status.

On the other hand, the processing circuit 104 is also in the non-operation status at the time spot T21. At the time spot T24, the processing circuit 104 is woken up to receive the packet stream PS and processes the packet stream PS during the process time period from the time spot T24 to the time spot T26. Further, the processing circuit 104 finishes processing the packet stream PS at the time spot T26 and is restored to the non-operation status. Similarly, the processing circuits 106, 108 and 110 are woken up in turn and are restored to the non-operation status after performing operation.

In the present embodiment, the packet receiving circuit 102 first processes a head of the packets in the packet stream PS and subsequently processes the rest of the packet stream PS and simultaneously transmits the packet stream PS to the next processing circuit 104. The processing circuit 104 is woken up to the operation status and performs operation. As a result, the process time period T22-T23 of the processing circuit 102 and the process time period T24-T26 of the processing circuit 104 are overlapped.

Further, the processing circuit 104 finishes processing the packet stream PS at the time spot T26 and is restored to the non-operation status.

It is appreciated that in other embodiments, each of the packet receiving circuit 102 and the processing circuit 104 can transmit the packet stream PS to the next stage of circuit after the packet stream PS is completely finished being processed. Under such a condition, the process time periods of the packet receiving circuit 102 and the processing circuit 104 are not overlapped.

In turn, the processing circuits 106, 108 and 110 process the packet stream PS respectively in the time period from the time spot T26 to the time spot T25, in the time period from the time spot T28 to the time spot T30 and in the time period from the time spot T30 to the time spot T27.

In an embodiment, the packet sending circuit 112 includes an upper layer circuit. The packet sending circuit 112 is also in the non-operation status at the time spot T21. At the time spot T32, the packet sending circuit 112 is woken up to receive the packet stream PS, processes the packet stream PS during the process time period from the time spot T32 to the time spot T29 and further transmits the packet stream PS to an external device (not illustrated). Further, the packet sending circuit 112 finishes processing the packet stream PS at the time spot T29 and is restored to the non-operation status.

In an embodiment, the external device can be such as a first-in-first-out (FIFO) queue, a direct memory access (DMA) circuit or other circuit modules included in the network apparatus that the packet transmission circuit 1 is disposed, or can be other apparatus coupled by the network apparatus through buses.

It is appreciated that in the present embodiment, four processing circuits 104, 106, 108 and 110 are used as an example. In different embodiments, other processing circuits can be disposed to perform corresponding processing on the packet stream PS according to practical requirements. The number and the function of the processing circuits are not limited by the number and the functions described in the above embodiments.

Figure 3:
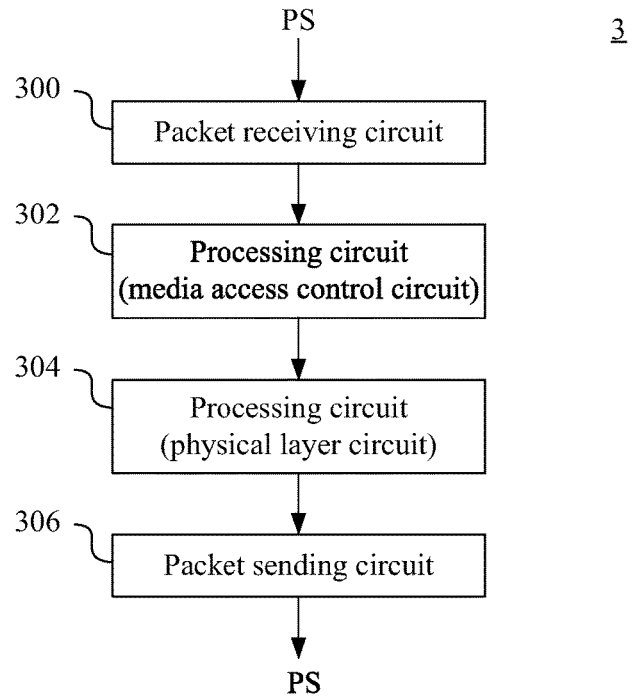
FIG. 3 is a block diagram of a packet transmission circuit in an embodiment of the present invention.
Figure 4:
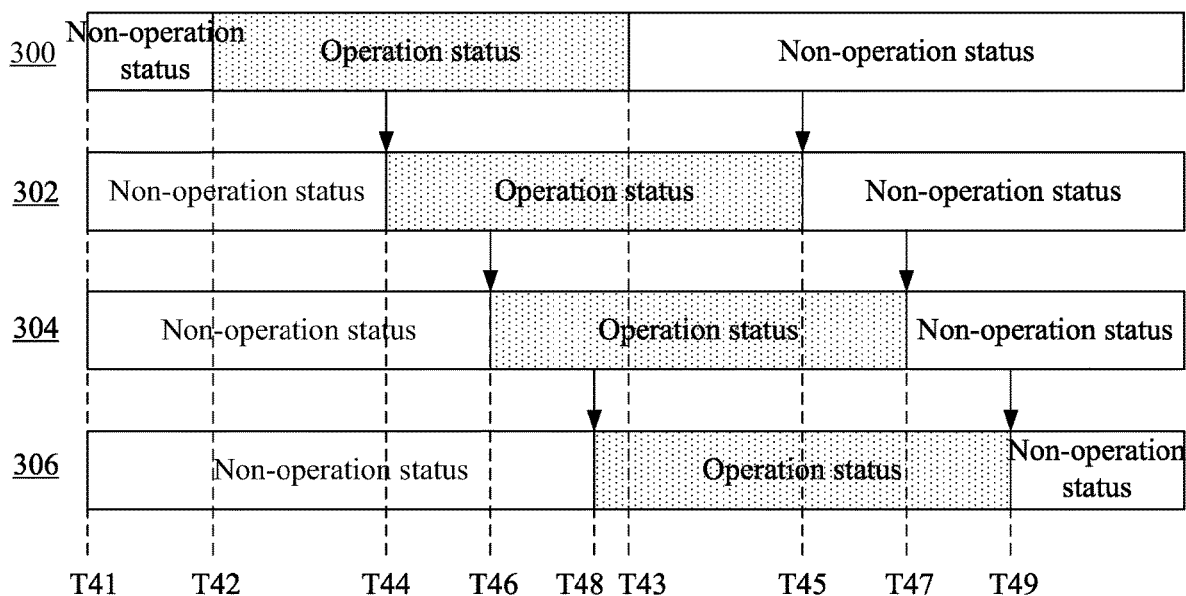
FIG. 4 is a timing diagram of the operation of each of the circuits included in the packet transmission circuit in an embodiment of the present invention.

Reference is made to FIG. 3 and FIG. 4 at the same time. FIG. 3 is a block diagram of a packet transmission circuit 3 in an embodiment of the present invention. FIG. 4 is a timing diagram of the operation of each of the circuits included in the packet transmission circuit 3 in an embodiment of the present invention.

The packet transmission circuit 3 includes a packet receiving circuit 300, a plurality of processing circuits 302 and 304 and a packet sending circuit 306. In the present embodiment, the packet transmission circuit 3 is a transmission terminal (TX) of a network apparatus (not illustrated).

In an embodiment, the packet receiving circuit 300 includes an upper layer circuit. The packet receiving circuit 300 is configured to receive the packet stream PS from a packet stream source (not illustrated). The packet stream source can be such as a first-in-first-out (FIFO) queue, a direct memory access (DMA) circuit or other circuit modules included in the network apparatus that the packet transmission circuit 3 is disposed, or can be other apparatus coupled by the network apparatus through buses.

In the present embodiment, since the packet transmission circuit 3 is the transmission terminal of the network apparatus, the packet transmission circuit 3 knows when to receive the packet according to the packet stream source. As a result, as illustrated in FIG. 4, the packet receiving circuit 300 can be in the non-operation status at the time spot T41 and is woken up to the operation status according to the control of the packet stream source at the time spot T42 to receive the packet stream PS.

When the packet receiving circuit 300 determines that the packet stream PS is received, the packet receiving circuit 300 processes the packets in the packet stream PS during the process time period from the time spot T42 to the time spot T43. Further, the packet receiving circuit 300 finishes processing the packet stream PS at the time spot T43 and is restored to the non-operation status.

In the present embodiment, the processing circuit 302 is a media access control circuit, and the processing circuit 304 is a physical layer circuit.

The processing circuits 302 and 304 are configured to be in the non-operation status and are configured to be woken up to the operation status according to an operation order thereof to receive and transmit the packet stream PS from the packet receiving circuit 300.

In an embodiment, the processing circuit 302, which is the media access control circuit, receives the packet stream PS first, processes the packet stream PS subsequently and transmits the packet stream PS to the processing circuit 304. The processing circuit 304, which is the physical layer circuit, receives the packet stream PS from the processing circuit 302, processes the packet stream PS and further transmits the packet stream PS to the packet sending circuit 306.

As illustrated in FIG. 4, the processing circuit 302 is in the non-operation status at the time spot T41. At the time spot T44, the processing circuit 302 is woken up to receive the packet stream PS from the packet receiving circuit 300 and processes the packet stream PS during the process time period from the time spot T44 to the time spot T45. Further, the packet receiving circuit 302 finishes processing the packet stream PS at the time spot T45 and is restored to the non-operation status.

On the other hand, the processing circuit 304 is in the non-operation status at the time spot T41. At the time spot T46, the processing circuit 304 is woken up to receive the packet stream PS from the packet receiving circuit 302 and processes the packet stream PS during the process time period from the time spot T46 to the time spot T47.

In the present embodiment, the processing circuit 302 first processes a head of the packets in the packet stream PS, and subsequently processes the rest of the packet stream PS and simultaneously transmits the packet stream PS to the next processing circuit 304. The processing circuit 304 is woken up to the operation status and performs operation. As a result, the process time period T44-T45 of the processing circuit 302 and the process time period T46-T47 of the processing circuit 304 are overlapped.

Further, the processing circuit 304 finishes processing the packet stream PS at the time spot T47 and is restored to the non-operation status.

It is appreciated that in other embodiments, each of the packet receiving circuit 302 and the processing circuit 304 can transmit the packet stream PS to the next stage of circuit after the packet stream PS is completely finished being processed. Under such a condition, the process time periods of the packet receiving circuit 302 and the processing circuit 304 are not overlapped.

The packet sending circuit 306 is also in the non-operation status at the time spot T41. At the time spot T48, the packet sending circuit 306 is woken up to receive the packet stream PS, processes the packet stream PS during the process time period from the time spot T48 to the time spot T49 and further transmits the packet stream PS to an external device (not illustrated). Further, the packet sending circuit 306 finishes processing the packet stream PS at the time spot T49 and is restored to the non-operation status.

In an embodiment, the packet sending circuit 306 includes a front-end circuit. When the packet transmission circuit 3 is disposed in a wireless network apparatus, the front-end circuit can be a radio frequency (RF) circuit. When the packet transmission circuit 3 is disposed in a wired network apparatus, the front-end circuit can be an Ethernet circuit.

In an embodiment, the external device can be an external network device that is connected by the front-end circuit through such as, but not limited to an antenna or a physical network wire.

It is appreciated that in the present embodiment, two processing circuit 302 and 304 are used as an example. In different embodiments, other processing circuits can be disposed to perform corresponding processing on the packet stream PS according to practical requirements. The number and the function of the processing circuits are not limited by the number and the functions described in the above embodiments.

In the embodiments described above, the switching of the non-operation status and the operation status of each of the packet receiving circuit, the processing circuit and the packet sending circuit can be implemented by using the mechanism of such as, but not limited to power gating or clock gating.

As a result, the packet transmission circuit 1 and the packet transmission circuit 3 of the present invention keep the circuits included therein in the non-operation status for a long time, wake up the circuits to the operation status when the packet stream is required to be processed and restore the circuits to the non-operation status. The packet transmission circuit 1 and the packet transmission circuit 3 no longer need to keep the circuits therein in the operation status for a long time that results in a waste of the power.

Figure 5:
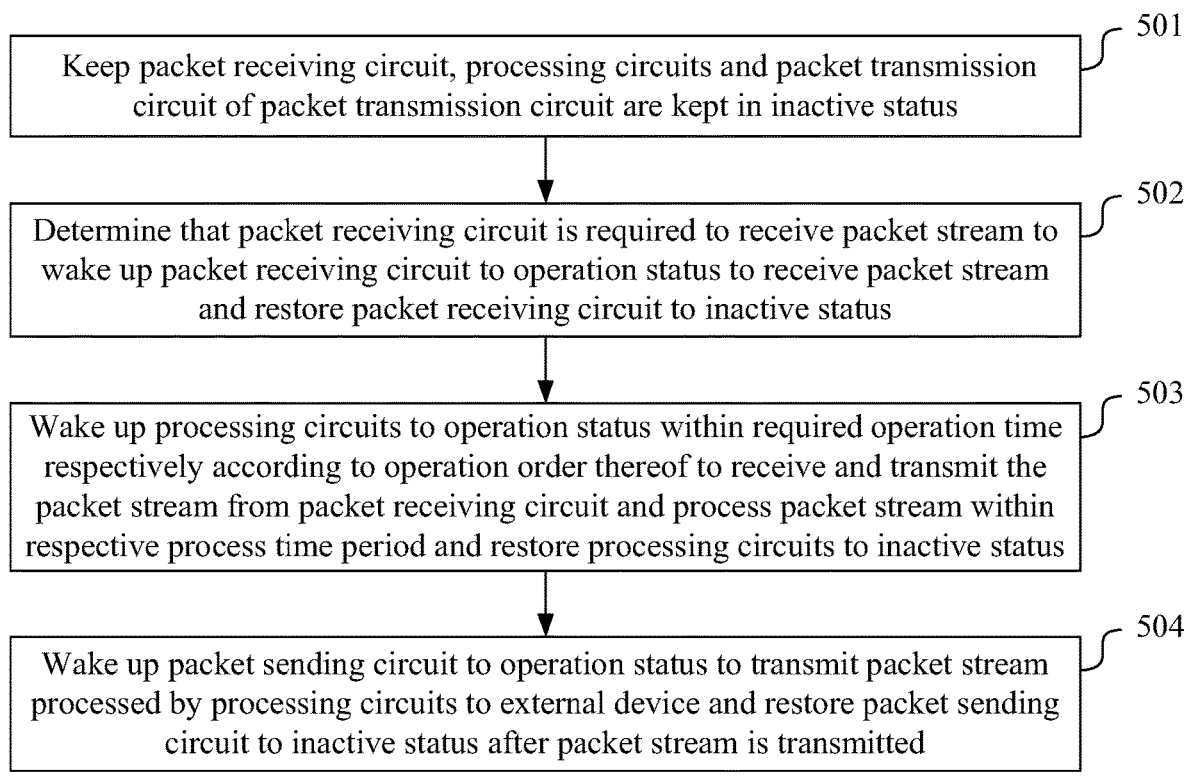
FIG. 5 is a flow chart of a packet transmission control method in an embodiment of the present invention.

Reference is now made to FIG. 5. FIG. 5 is a flow chart of a packet transmission control method 500 in an embodiment of the present invention. The packet transmission control method 500 can be used in the packet transmission circuit 1 illustrated in FIG. 1 or the packet transmission circuit 3 illustrated in FIG. 3. The packet transmission circuit 1 illustrated in FIG. 1 is used as an example in the following paragraphs.

The packet transmission control method 500 includes the steps outlined below (The operations are not recited in the sequence in which the operations are performed. That is, unless the sequence of the operations is expressly indicated, the sequence of the operations is interchangeable, and all or part of the steps may be simultaneously, partially simultaneously, or sequentially performed).

In step 501, the packet receiving circuit 102, the processing circuits 104, 106, 108 and 110 and the packet transmission circuit 112 of the packet transmission circuit 1 are kept in the non-operation status.

In step 502, the packet receiving circuit 102 is determined to be required to receive the packet stream PS to wake up the packet receiving circuit 102 to the operation status to receive the packet stream PS and the packet receiving circuit 102 is further restored to the non-operation status after the packet stream PS is received.

In an embodiment, the packet receiving circuit 102 is woken up by the packet detection circuit 100 after the packet detection circuit 100 detects the packet stream PS.

In step 503, the processing circuits 104, 106, 108 and 110 are woken up to the operation status within the required operation time respectively according to the operation order thereof to receive and transmit the packet stream PS from the packet receiving circuit 102 and process the packet stream PS within a respective process time period and the processing circuits 104, 106, 108 and 110 are restored to the non-operation status after the packet stream PS is processed.

In step 504, the packet sending circuit 112 is woken up to the operation status to transmit the packet stream PS processed by the processing circuits 104, 106, 108 and 110 to an external device and the packet sending circuit 112 is restored to the non-operation status after the packet stream is transmitted.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A packet transmission control method used in a packet transmission circuit, comprising:
keeping a packet receiving circuit, a plurality of processing circuits and a packet sending circuit of the packet sending circuit in a non-operation status, wherein the processing circuits comprise a physical layer circuit and a media access control (MAC) circuit;
determining that the packet receiving circuit is required to receive a packet stream to wake up the packet receiving circuit to an operation status to receive the packet stream and further restoring the packet receiving circuit to the non-operation status after the packet stream is received;
waking up the media access control (MAC) circuit to the operation status to receive and process the packet stream from the packet receiving circuit and restoring the media access control (MAC) circuit to the non-operation status after the packet stream from the packet receiving circuit has been processed;
waking up the physical layer circuit to the operation status to receive and process the processed packet stream from the media access control (MAC) after the media access control (MAC) processes the packet stream, and restoring the physical layer circuit to the non-operation status after the processed packet stream from the media access control (MAC) has been processed; and
waking up the packet sending circuit to the operation status to transmit the packet stream processed by the processing circuits to an external device and restoring the packet sending circuit to the non-operation status after the packet stream is transmitted.

2. The packet transmission control method of claim 1, wherein the process time period of the physical layer circuit is not overlapped with the process time period of the media access control (MAC) circuit.

3. The packet transmission control method of claim 1, wherein the media access control (MAC) circuit first processes a head of at least one packet in the packet stream and subsequently processes the rest of the packet stream and simultaneously transmits the packet stream to the physical layer circuit, in which the process time period of the physical layer circuit is partially overlapped with the process time period of the media access control (MAC) circuit.

4. The packet transmission control method of claim 1, wherein the packet transmission circuit is a receiving terminal (RX) of a network apparatus, in which the packet receiving circuit comprises a front-end circuit, and the packet sending circuit comprises an upper layer circuit.

5. The packet transmission control method of claim 1, wherein the packet transmission circuit is a transmission terminal (TX) of a network apparatus, in which the packet receiving circuit comprises an upper layer circuit, and the packet sending circuit comprises a front-end circuit;
wherein when the packet receiving circuit is in the non-operation status, the packet receiving circuit is woken up to the operation status according to a control of a packet stream source to receive and process the packet stream and is restored to the non-operation status after the packet stream is processed.

6. A packet transmission circuit, comprising:
a packet receiving circuit configured to be in a non-operation status, configured to be woken up to an operation status to receive a packet stream when the packet receiving circuit is determined to be required to receive the packet stream and configured to be restored to the non-operation status after the packet stream is received;
a physical layer circuit and a media access control (MAC) circuit configure to be in the non-operation status, wherein:
the media access control (MAC) circuit is configured to be woken up to the operation status to receive and process the packet stream from the packet receiving circuit and restoring the media access control (MAC) circuit to the non-operation status after the packet stream from the packet receiving circuit has been processed; and the physical layer circuit is configured to be woken up to the operation status to receive and process the processed packet stream from the media access control (MAC) after the media access control (MAC) processes the packet stream, and restoring the physical layer circuit to the non-operation status after the processed packet stream from the media access control (MAC) has been processed; and a packet sending circuit configured to be in the non-operation status, configured to be woken up to the operation status to transmit the packet stream processed by the processing circuits to an external device and configured to be restored to the non-operation status after the packet stream is transmitted.

7. The packet transmission circuit of claim 6, wherein the process time period of the physical layer circuit is not overlapped with the process time period of the media access control (MAC).

8. The packet transmission circuit of claim 6, wherein the media access control (MAC) first processes a head of at least one packet in the packet stream and subsequently processes the rest of the packet stream and simultaneously transmits the packet stream to the physical layer circuit, in which the process time period of the physical layer circuit is partially overlapped with the process time period of the media access control (MAC) circuit.

9. The packet transmission circuit of claim 6, wherein the packet transmission circuit is a receiving terminal (RX) of a network apparatus, in which the packet receiving circuit comprises a front-end circuit, and the packet sending circuit comprises an upper layer circuit.

10. The packet transmission circuit of claim 6, wherein the packet transmission circuit is a transmission terminal (TX) of a network apparatus, in which the packet receiving circuit comprises an upper layer circuit, and the packet sending circuit comprises a front-end circuit;

wherein when the packet receiving circuit is in the non-operation status, the packet receiving circuit is woken up to the operation status according to a control of a packet stream source to receive and process the packet stream and is restored to the non-operation status after the packet stream is processed.

* * * * *